Oct. 10, 1950          C. E. SMITH          2,525,430
REMOVAL OF GLUTEN FROM STARCH
Filed Nov. 29, 1946
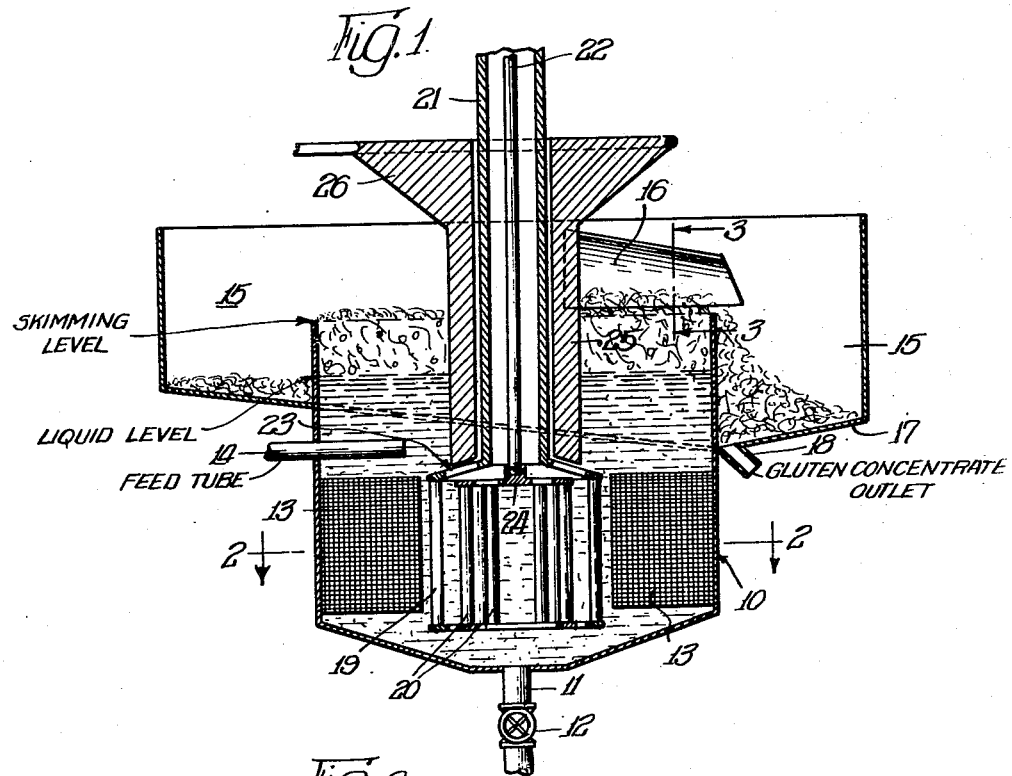
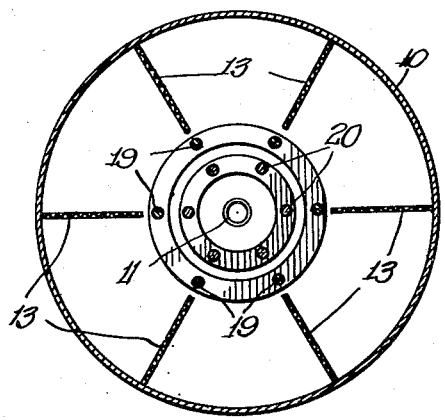
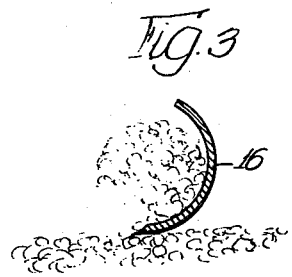
INVENTOR.
Clifford E. Smith,
BY
Cromwell, Greist & Warden
attys Patented Oct. 10, 1950

2,525,430

UNITED STATES PATENT OFFICE 2,525,430

REMOVAL OF GLUTEN FROM STARCH

Clifford E. Smith, Decatur, Ill., assignor to A. E. Staley Manufacturing Company, Decatur, Ill., a corporation of Delaware Application November 29, 1946, Serial No. 713,123

5 Claims. (Cl. 127—69)

The present invention relates to improvements in the manufacture of starch from corn by the wet milling method. More specifically, it pertains to improvements in the separation of gluten, for example, from corn starch, having particular reference to a novel method of removal of gluten from the starch by a flotation process.

In the wet milling method of manufacturing corn starch, the steeped corn, mixed with water, is subjected to a series of milling and sieving operations for the purpose of separating the germs, hulls, and coarse fiber from the starch and gluten. The mixed starch and gluten, in water suspension and known as mill starch or table heads, are separated from one another by methods that take advantage of the difference in specific gravity of the suspended solids. Formerly this was done almost exclusively by tabling, i. e., by slowly admitting the mill starch to the upper end of a gently sloping long narrow trough so that the starch would settle to the bottom of the trough, or table, and the gluten would run out the lower end over an adjustable wier. When the trough became filled with starch, the flow of mill starch was stopped, the starch at the extreme lower end of the trough, being contaminated with some deposited gluten, was flushed out with water and returned to the tabling operation, and the remaining starch was then flushed out with water and recovered by filtration. At present, continuous separation of the starch from gluten in mill starch by means of suitably designed centrifuges is replacing the discontinuous tabling operation.

The expressions "starch underflow" and "gluten overflow" are commonly applied to the suspensions of purified starch and gluten concentrate, respectively, obtained in the centrifugal separation of starch from gluten. For purposes of the present invention, these expressions are applied respectively to aqueous suspension of purified starch and gluten concentrate obtained by any method based on the specific gravity difference between starch and gluten, such as, centrifuging or tabling.

Owing to the need for discharging minimum quantities of organic wastes from the starch factory and to the desire for keeping evaporation of steepwater to a minimum, all present day manufacturers of wet-milled corn starch use the so-called bottling-up process. In this process, wash waters and other liquors are recycled wherever possible, and additions of fresh water to the system are held to a minimum.

Because of use of the bottling-up process, and despite efforts to keep the concentration of solubles in the mill starch water as low as possible, so as to facilitate the separation of starch from gluten, appreciable concentrations of salts, proteins, carbohydrates and other substances leached from the corn appear in the mill starch water. In general, this concentration will amount to at least one part per hundred parts of water. Often it is much higher than this.

It is very difficult to remove all the insoluble protein from corn starch by tabling or centrifuging. These conventional methods usually provide refined starch containing about 0.4 per cent protein. It has been proposed to reduce the protein content of the starch below this level by froth flotation after the bulk of the protein has been removed by conventional means, but the methods disclosed do not achieve their objective when applied to starch recovered from the bottling-up process.

A principal object of the invention is to provide an improved process for removing gluten from an aqueous slurry containing starch, gluten and solubles, such as mill starch, and especially for manufacturing corn starch of low protein content.

Another object of the invention is the provision of an improved technique for skimming a gluten-rich top layer from the froth produced on the surface of a starch-bearing liquor.

Still another object of the invention is to increase the starch refining capacity of a factory by operating the usual gluten separating facilities, i. e., tables, centrifuges, or combinations of these, at increased rates and purifying the crude starch thus obtained by means of this invention.

A further object of the invention is to provide an improved flotation process for purifying wet-milled corn starch which is simple and economical to operate, and which requires a relatively small amount of space and equipment for handling a large volume of material.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

For a fuller understanding of the nature and objects of the invention reference should be had to the following detailed description taken in connection with the accompanying drawing, in which:

Fig. 1 is a vertical sectional view of a preferred form of apparatus embodied by the present invention;

Fig. 2 is a sectional view taken along the lines 2—2 of Fig. 1 and looking in the direction of the arrows; and Fig. 3 is a transverse sectional view of the blade or scoop taken along the lines 3—3 of Fig. 1 and looking in the direction of the arrows.

The present invention is based upon the discovery that the character of the foam or froth produced by aeration of certain starch liquors occurring in the wet milling method of manufacturing corn starch is markedly influenced by the concentration of dissolved materials in those liquors. If the concentration of solubles is relatively high, as it normally is in the bottling-up process, relatively little segregation of gluten occurs in the froth. Furthermore, the froth obtained from high solubles starch liquors is uniform in quality and of comparatively high density, so that continued aeration of such starch-bearing liquors rather quickly converts them wholly into foam with little or no attending refining action. On the other hand, if the solubles content of the starch liquor is adjusted to a sufficiently low value, aeration of such liquor yields an entirely different type of foam on top of the liquid. Not only is the foam as a whole less dense in the latter case than in the former, but it is also of non-uniform character. The upper part of the foam layer consists of bubbles that are considerably larger and more fragile than those in the lower part. In addition to this, the ratio of gluten (or protein) to starch in the upper part of the foam is substantially greater than it is in the lower part, where that ratio is very nearly the same as it is in the underlying liquor. It is obvious that appreciable refining of the starch will occur if the upper layer of foam in the latter case is removed from the aerated liquor.

It will be seen that the invention comprises two principal parts; first, adjustment or control of the solubles content of the starch bearing liquor to a suitably low value, and second, removal of the upper gluten-rich portion of froth produced on the liquor by aeration.

Optimum results, as regards concentration of gluten in the upper layer of froth, are obtained when the concentration of solubles in the starch-bearing water lies within the range of about one part to two parts per thousand parts of water. Distinctly beneficial refining action is obtained, however, if the concentration of solubles is as low as about two parts per ten thousand parts of water (0.02 per cent) or as high as about five parts per thousand parts of water (0.5 per cent).

Suitable reduction of the solubles content of the starch-bearing water may be conveniently accomplished by decanting as much as possible of the high solubles water and making up the starch suspension to original volume with fresh water. If a single decantation and reslurrying with fresh water does not lower the solubles content as much as desired, one or more repetitions of the process will accomplish the desired result. As an alternative to decantation, the aqueous suspension of starch and gluten to be refined by froth flotation may first be filtered, and washed on the filter if necessary, then made up with fresh water to provide a suspension containing a satisfactory solubles content.

It will be apparent that decantation and filtration, followed by reslurrying of the starch with fresh water, are equivalent means for lowering the solubles concentration of the suspending water. In either case, the net result is replacement of part of the original suspending water, and its solublues content, with fresh water.

The gluten-rich bubbles comprising the upper layer of the froth produced on the surface of a starch-bearing liquor in accordance with this invention are so fragile that they cannot be successfully skimmed off by methods heretofore used in flotation processes. Application of such skimming methods to the fragile bubbles causes them to break and coalesce with the more stable lower stratum of froth, which is considerably richer in starch than the upper layer.

To take full advantage of the concentration of gluten in the upper layer of froth, it is necessary to separate that layer from the underlying layer. As indicated above, this cannot feasibly be done by ordinary scraping or skimming. The upper layer must be picked up and either thrown or transported away. This separation may be satisfactorily accomplished by use of the device illustrated in the accompanying drawing.

Referring more particularly to the drawing, a cylindrical vessel 10 is illustrated with an open top and a gently sloping conical bottom equipped with a centrally located outlet 11, and an associated valve 12, a set of vertical baffle screens 13 attached to the inside of the vessel wall near the bottom as shown and extending inwardly along radial planes, and an inlet tube 14 protruding a substantial distance through the side wall of the vessel and piercing the wall at a point above the tops of the baffle screens and closer to the top than to the bottom of the vessel. Surrounding the top of the vessel is a concentric shield 15 spaced far enough away from the walls of the vessel 10 so that foam thrown against it by a rotating curved blade 16 will not splash back into the vessel. The upper edge of the shield 15 extends far enough above the top of the vessel 10 to prevent loss of material by spattering when foam is thrown against it by the rotating blade 16, and the lower edge of the shield is joined to the wall of the vessel 10 by an annular strip 17 so arranged that coalesced foam draining from the vertical wall of the shield and collecting on the annular strip drains to the outlet tube 18.

Two cylindrical cages, 19 and 20, each comprising a plurality of vertically arranged bars attached to a supporting hollow shaft 21 and a solid shaft 22, respectively, by means of annular members 23 and 24, respectively, are suspended in the vessel 10 near its bottom. The cages are concentric, i. e., they have common vertical axes which coincide with the vertical axis of the vessel 10. The inner cage 20 is rotatable on its supporting shaft 22; the outer cage 19 is stationary.

The outer surface of the hollow shaft 21 and the annular member 23 support a sleeve 25 whose upper portion is expanded into a pulley 26.

Attached near the top of the sleeve 25 and below the pulley 26 is the rotatable blade or scoop 16 (see Fig. 1) with a lower cutting edge lying in a horizontal plane slightly above the top of the vessel 10 and extending somewhat beyond the wall of the vessel. The purpose of the scoop 16, as it is rotated above the top of the vessel 10, is to pick up the upper layer of foam on the aerated starch-bearing liquor in the vessel, and throw it against the shield 19. In a simple satisfactory form, the cross section of the scoop 16, taken in a plane at a right angle to its longitudinal axis, is roughly semi-circular with the open part of the cusp pointing in the direction of rotation. It will thus be apparent that the scoop or skimmer does not brush or drag the upper layer of foam away from the lower one. Instead, it separates the two layers by a combined cutting, lifting, and throwing action.

Supports for the stationary hollow shaft 21 and supporting and driving means for the rotatable shaft 22 are not shown. Also not shown are means for admitting compressed air into the hollow tube 21 surrounding the shaft 22.

In operation of the apparatus, starch-bearing liquor of suitable solubles content is admitted to the vessel 10, with the outlet tube 11 closed, until the liquid level is about two inches below the top of the vessel. A moderate stream of compressed air is forced through the liquor through the hollow tube 21. The inner cage 20 is then rotated at such a rate that the incoming air is broken up into small bubbles and distributed throughout the liquor. The bubbles rise to the surface of the liquor, creating a froth. The baffle screens 13 prevent swirling of the liquor and consequent prevention of formation of a two-layered froth. The agitation and aeration of the liquor causes its level to rise somewhat. Additional liquor is admitted to the vessel 10, without discontinuing the agitation and aeration, until its level is about one inch below the top of the vessel. As soon as a yellowish gluten-rich top layer accumulates on the froth, which usually occurs at a total froth thickness of about two inches, the top layer is removed by rapidly rotating the scoop 16.

The total thickness of the froth and the relative thickness of the gluten-rich layer depend upon numerous factors, chief of which are the rate of air flow, degree of agitation provided by the spinning inner cage, and the nature and concentration of solubles in the starch-bearing liquor. If the cutting plane of the scoop is fixed, and does not coincide with the plate of division between the two layers of a particular froth, coincidence of the planes may be easily obtained by simply raising or lowering the liquor level in the vessel 10. In general, it will be found more desirable to adjust the cutting depth of the scoop by adjusting the liquor level than by attempting to do by adjustment of air flow and speed of cage rotation.

As set forth above, the concentration of solubles in the starch-bearing liquor has a very important bearing on the separation of gluten from starch in a froth built up on the surface of that liquor. Rate of air flow through the liquor and degree of additional agitation also have some bearing on that separation, because excessive air flow and agitation will obviously disturb the froth so much that sufficient segregation of gluten and starch therein cannot occur. Best results are obtained by regulating the air flow and speed of cage rotation so that very little disturbance of the froth is produced by these means.

The flow of starch-bearing liquor through the vessel 10 may be either continuous or intermittent. If it is to be continuous, the liquor is preferably admitted through the inlet tube 14 and allowed to flow out through the tube 11 and the valve 12 at the same rate.

Also, the action of the scoop 16 may be either continuous or intermittent, i. e., the scoop may be rotated intermittently, allowing for build-up of foam between the periods of rotation.

The purified starch flowing from the bottom outlet 11 of vessel 10 is recovered, and washed if desired, by conventional means.

The gluten-rich mixture of starch and gluten draining from tube 18 is returned to the tables or other primary means for separating the gluten from starch.

For a fuller understanding of the nature and objects of this invention, reference is made to the following examples, which are presented for illustrative purposes only and which are not to be construed as indicating the limitations of the invention. The flotation vessel used in the examples was 9 inches in diameter and 6 inches deep, measured at the side wall. Six baffle screens, spaced equidistantly around the inside of the vessel, were attached to the vessel wall as shown in the drawing. The baffles were made of one-eighth inch mesh woven wire screen. The cages, shield, and scoop were constructed approximately to scale as indicated in the drawing.

*Example 1*

Starch flushed from tables and given a single wash on "American" filters was slurried with additional water to form a 20° Baumé starch slurry. The suspending water in this slurry contained 0.144 gram of dissolved solids per 100 ml., and the suspended starch, on a dry basis, contained 0.45 per cent of insoluble protein. A sample of the slurry was refined batchwise in the froth flotation apparatus over a period of three minutes by spinning the inner cage at a speed of 1750 R. P. M. while blowing a moderate stream of air into the slurry and operating the scoop, or skimmer, intermittently. After this three minute refining operation, it was found that the insoluble protein content of the starch remaining in the slurry had been reduced to 0.32 per cent, that only 0.56 per cent of the suspended insoluble material had been removed as froth, and that the protein content of the insoluble froth material averaged 16.7 per cent. The temperature of the starch slurry being froth refined was 100° F.

*Example 2*

Starch flushed from tables and given a double wash on American type filters was slurried with additional water to form a 20° Baumé starch slurry. The suspending water contained 0.030 gram of dissolved solids per 100 ml., and the suspended starch, on a dry basis, contained 0.39 per cent of insoluble protein. A sample of the slurry was refined batchwise in the froth flotation apparatus over a period of one minute by spinning the inner cage at a speed of 2530 R. P. M. while blowing a moderate stream of air into the slurry and operating the scoop intermittently. This treatment lowered the insoluble protein content of the remaining starch to 0.29 per cent, removed 1.24 per cent of the suspended insoluble material as froth, and yielded a froth material containing 5.53 per cent protein on the basis of the dry weight of insoluble matter.

*Example 3*

Ten gallons of a 20° Baumé slurry of single washed starch, i. e., starch flushed from tables and washed once on American filters, was run twice through the flotation apparatus. The average detention time of the slurry in the apparatus during the first pass was about 2.5 minutes; during the second pass, it was about 2.3 minutes. The suspending water contained 0.122 gram of dissolved solids per 100 ml., and the inner cage was rotated at a speed of 1810 R. P. M. Rate of air flow was the same as in the foregoing examples. Analyses and measurements made after each pass showed that in the first pass the insoluble protein content of the starch was reduced from 0.46 per cent to 0.35 per cent by removing 1.3 per cent of total suspended solids as a froth whose solids contained 9.1 per cent insoluble protein, and that in the second pass the protein content of the starch was lowered from 0.36 to 0.32 per cent by removing 1.5 per cent of the total suspended solids as a froth whose solids contained 2.1 per cent protein. Thus in a continuous operation requiring a total detention time of about 5 minutes, the starch was refined from 0.46 per cent protein to 0.32 per cent protein by removing 2.8 per cent of the total suspended solids as a froth whose solids contained an average of 5.4 per cent protein.

Example 4

A slurry of starch flushed from tables and passed over fine silk was refined batchwise in the flotation apparatus for a period of three minutes. The water in the slurry contained 1.12 grams of dissolved solids per 100 ml., the rate of air flow was the same as used in Examples 1 and 2, and the inner cage was rotated at a speed of 1400 R. P. M. Very little refining of the starch was thus accomplished. The insoluble protein content was reduced from an initial value of 0.44 per cent to a final value of 0.41 per cent by removing 4.3 per cent of the total suspended solids as a froth whose solids contained only 0.52 per cent insoluble protein.

All protein values mentioned herein were obtained by determining nitrogen by the Kjeldahl procedure and multiplying the nitrogen value thus obtained by the factor 6.25.

Concentrations of dissolved solids in the suspending water of starch slurries were determined by filtering off the suspended solids and evaporating a measured volume of filtrate to dryness at 100° C. in a tared dish, noting the increased weight of the dish after evaporation.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In a process for the production of starch from an aqueous slurry comprising starch, gluten and solubles, the solids of which slurry are predominantly starch, the improvement comprising subjecting the slurry to froth flotation for the removal of gluten therefrom, and selectively removing only an upper strata of the froth, said froth being composed of air bubbles encased in liquid films bearing the gluten.

2. In a process for the production of starch from an aqueous slurry comprising starch, gluten and more than about 0.5 per cent solubles based on the water content of the slurry, the solids of said slurry being predominantly starch, the steps of reducing the solubles content of said slurry to a value lying within the range of about 0.02 to 0.5 per cent, then subjecting the slurry to froth flotation for the removal of gluten therefrom, and selectively removing only a gluten-rich upper layer of said froth.

3. In a process for the production of starch from an aqueous slurry comprising starch, gluten and more than about 0.5 per cent solubles based on the water content of the slurry, the steps of separating the slurry into a starch-rich underflow and gluten-rich overflow, reducing the solubles content of the starch underflow to a value lying within the range of about 0.02 to 0.5 per cent, and then subjecting the starch underflow to froth flotation for removal of additional gluten therefrom.

4. In a process for the production of starch from an aqueous slurry obtained in the bottling-up system, said slurry containing starch, gluten and more than 0.5 per cent solubles based on its water content, the steps of separating the slurry into a starch-rich underflow and a gluten-rich overflow, reducing the solubles content of the starch underflow to a value lying within the range of about 0.02 to 0.5 per cent, and then subjecting the starch underflow to froth flotation for removal of additional gluten therefrom.

5. In a process for the production of starch from an aqueous slurry comprising starch, gluten and solubles, the content of said solubles being in the range of 0.02 to 0.5 per cent, and the solids of said slurry being predominantly starch, the improvement which comprises subjecting the slurry to froth flotation for the removal of gluten therefrom, and selectively removing only a gluten-rich upper strata.

CLIFFORD E. SMITH.

REFERENCES CITED

The following references are of record in the file of this patent:

UNITED STATES PATENTS

| Number | Name | Date |
|---|---|---|
| 994,497 | Berrigan | June 6, 1911 |
| 1,221,990 | Holden | Apr. 10, 1917 |
| 2,039,605 | Peltzer | May 5, 1936 |
| 2,124,284 | Boie | July 19, 1938 |
| 2,132,251 | Wagner | Oct. 4, 1938 |
| 2,138,274 | Greenfield | Nov. 29, 1938 |